US007962185B2

(12) United States Patent
Hung (10) Patent No.: US 7,962,185 B2
(45) Date of Patent: Jun. 14, 2011

(54) SLIDE MECHANISM AND SLIDE-TYPE ELECTRONIC DEVICE HAVING THE SLIDE MECHANISM

(75) Inventor: Kuang-Hui Hung, Taipei (TW)

(73) Assignee: Lite-On Technology Corp., Taipei (TW)

( * ) Notice: Subject to any disclaimer, the term of this patent is extended or adjusted under 35 U.S.C. 154(b) by 875 days.

(21) Appl. No.: 11/984,555

(22) Filed: Nov. 20, 2007

(65) Prior Publication Data
US 2009/0131127 A1    May 21, 2009

(51) Int. Cl.
*H04M 1/00* (2006.01)
(52) U.S. Cl. ............... 455/575.1; 455/575.2; 455/575.3; 455/575.4; 361/679.09
(58) Field of Classification Search .... 455/575.1–575.4; 361/679.01–679.61
See application file for complete search history.

(56) References Cited

U.S. PATENT DOCUMENTS

| 7,065,835 B2 | 6/2006 | Kuramochi |
| 2007/0058328 A1 | 3/2007 | Zuo et al. |

*Primary Examiner* — Jinsong Hu
*Assistant Examiner* — Nathan Taylor
(74) *Attorney, Agent, or Firm* — Rosenberg, Klein & Lee (57) ABSTRACT

A sliding type electronic device includes a slide mechanism, and first and second casings coupled slidably to each other through the slide mechanism. The second casing is disposed on the first casing, and includes a frame seat and an auxiliary casing received in the frame seat. The slide-type electronic device further includes a guiding unit and a pivot unit. The guiding unit is provided on the first casing, and the pivot unit is provided on the auxiliary casing. When the second casing slides relative to the first casing, the auxiliary casing flips up relative to the frame seat.

20 Claims, 9 Drawing Sheets

SLIDE MECHANISM AND SLIDE-TYPE ELECTRONIC DEVICE HAVING THE SLIDE MECHANISM

BACKGROUND OF THE INVENTION

1. Field of the Invention

The invention relates to a slide mechanism and a slide-type electronic device having the slide mechanism, more particularly to a slide mechanism utilizing gear transmission to effect sliding movement, and to a slide-type electronic device having the slide mechanism.

2. Description of the Related Art

U.S. Patent Application Publication No. 2007/0058328 discloses a slide mechanism for a slide-type electronic device. The slide mechanism includes a rack gear engaging a pinion gear of a cam assembly for power transmission. The cam assembly is mounted on a bracket, and a torsion spring is secured on the bracket to provide a spring force to the pinion gear.

In addition, U.S. Pat. No. 7,065,835 discloses a slide hinge structure that utilizes a link mechanism to connect upper and lower casings of an electronic device such that the upper and lower casings are slidable relative to each other, and such that the upper casing can flip up relative to the lower casing.

SUMMARY OF THE INVENTION

Therefore, an object of the present invention is to provide a slide mechanism with a structure different from those of the aforementioned prior art.

Another object of the present invention is to provide a slide-type electronic device having a slide mechanism that has a structure different from those of the aforementioned prior art.

A further object of the present invention is to provide a slide-type electronic device that enables a casing portion thereof to flip up during sliding of a casing of the electronic device.

Accordingly, the slide mechanism of this invention includes a shell unit, a pinion gear, a sliding assisting member, and a rack gear.

The shell unit includes a bottom wall, a top wall spaced apart from the bottom wall and slidable back and forth relative to the bottom wall, and a surrounding wall disposed between and connected to one of the bottom wall and the top wall. The pinion gear is mounted pivotally to the bottom wall. The sliding assisting member includes a fixing portion connected to and rotatable with the pinion gear, and a resilient portion resiliently stretchable and retractable relative to the fixing portion and abutting against an inner wall surface of the surrounding wall. The rack gear is provided on the top wall and meshes with the pinion gear such that, when the top wall is slid relative to the bottom wall, the rack gear brings the pinion gear and the sliding assisting member to rotate so as to cause the resilient portion to slide along the inner wall surface of the surrounding wall.

The slide-type electronic device of this invention includes a slide mechanism, and first and second casings that are coupled slidably to each other through the slide mechanism. The second casing is disposed on the first casing. The slide mechanism includes a shell unit, a pinion gear, a sliding assisting member, and a rack gear.

The shell unit includes a bottom wall, a top wall spaced apart from the bottom wall and slidable back and forth relative to the bottom wall, and a surrounding wall disposed between and connected to one of the bottom wall and the top wall. The bottom wall is connected to the first casing. The top wall is connected to the second casing. The pinion gear is mounted pivotally on the bottom wall. The sliding assisting member includes a fixing portion connected to and rotatable with the pinion gear, and a resilient portion resiliently stretchable and retractable relative to the fixing portion and abutting against an inner wall surface of the surrounding wall. The rack gear is provided on the top wall and meshes with the pinion gear such that, when the second casing is slid relative to the first casing to result in sliding movement of the top wall relative to the bottom wall, the rack gear brings the pinion gear and the sliding assisting member to rotate so as to cause the resilient portion to slide along the inner wall surface of the surrounding wall.

BRIEF DESCRIPTION OF THE DRAWINGS

Other features and advantages of the present invention will become apparent in the following detailed description of the preferred embodiments with reference to the accompanying drawings, of which:

FIG. 3 is a top view to illustrate the upper shell in the process of being slid rearward relative to the lower shell;

DETAILED DESCRIPTION OF THE PREFERRED EMBODIMENTS

Figure 1:
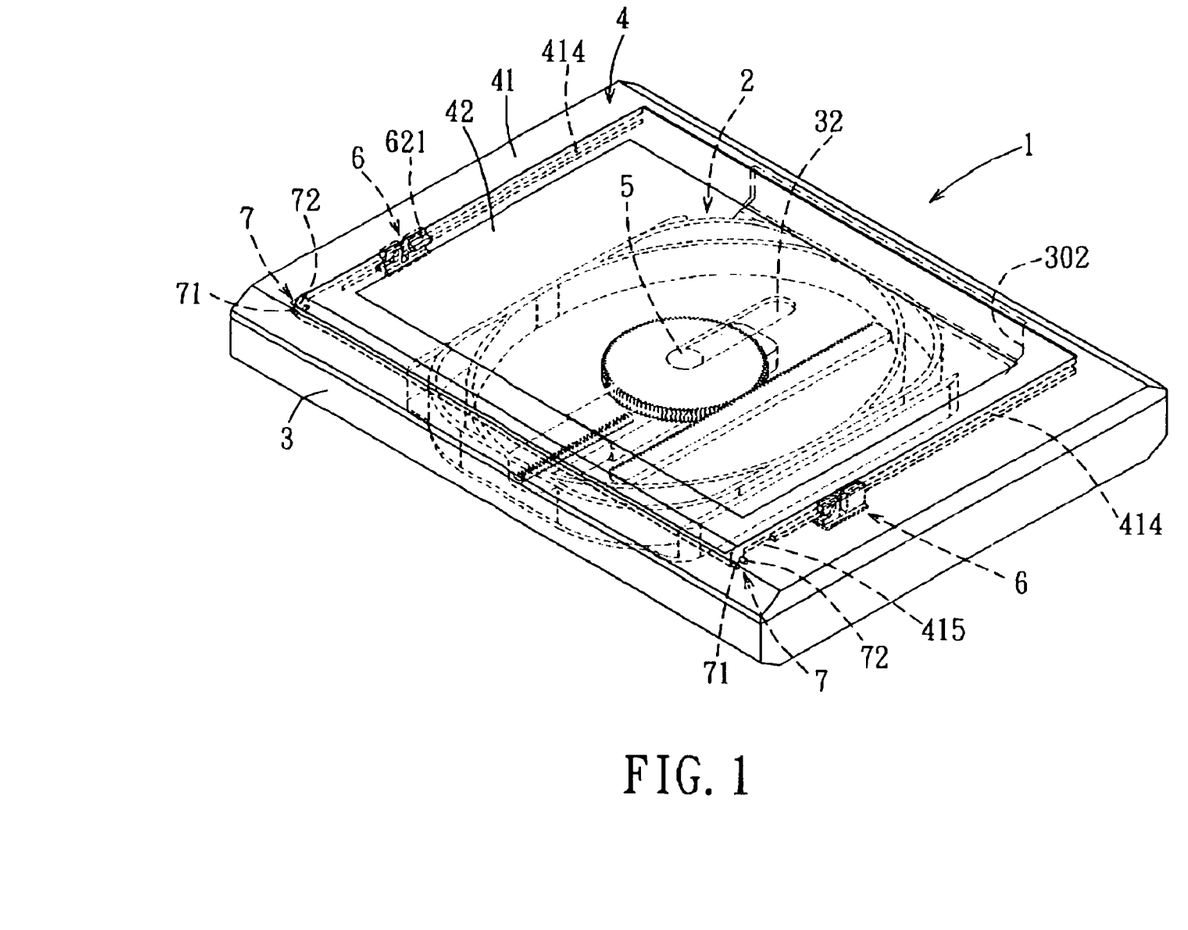
FIG. 1 is a perspective view of the first preferred embodiment of a slide-type electronic device according to the present invention in a closed state.
Figure 2:
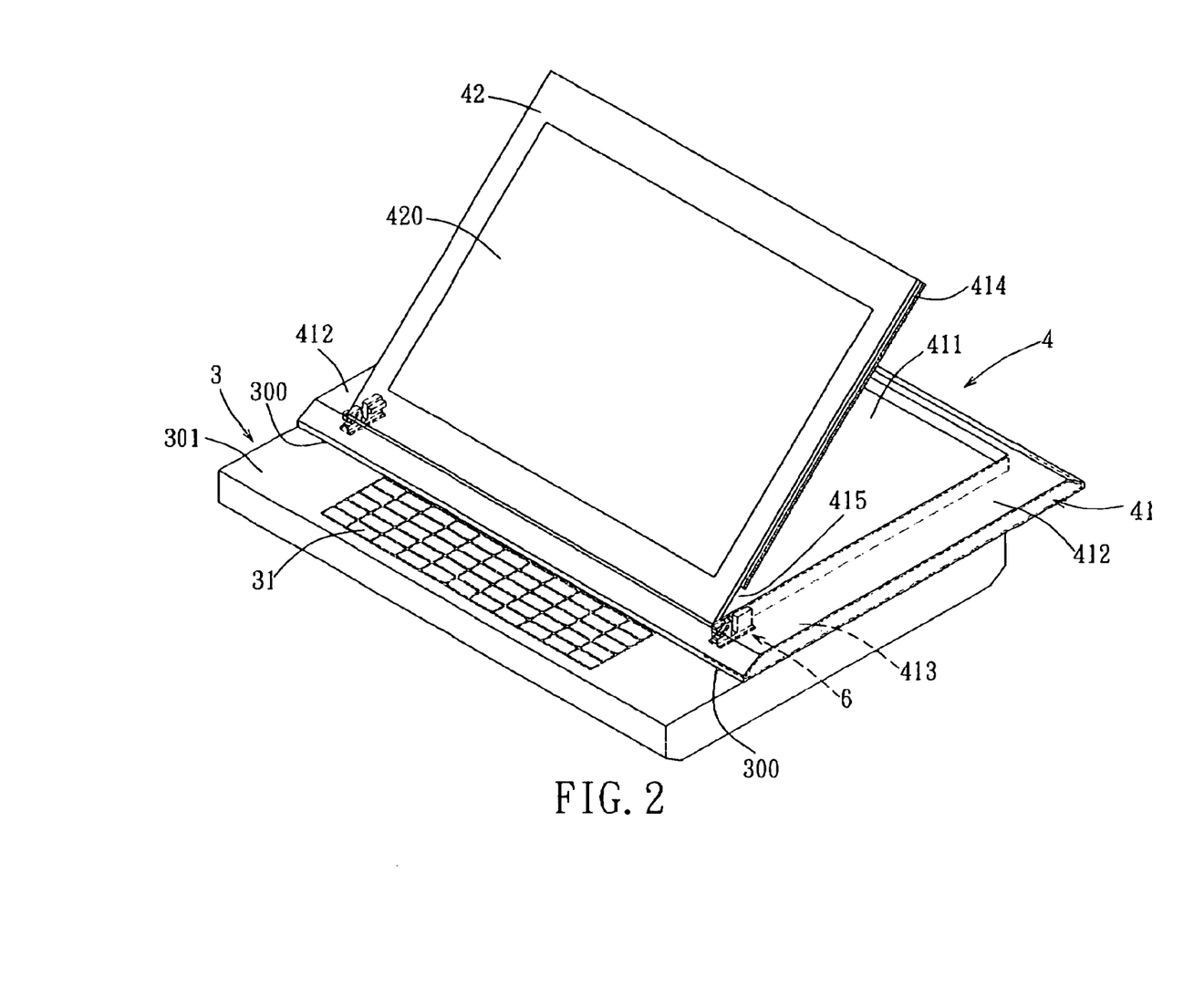
FIG. 2 is a perspective view of the first preferred embodiment in an extended state.
Figure 3:
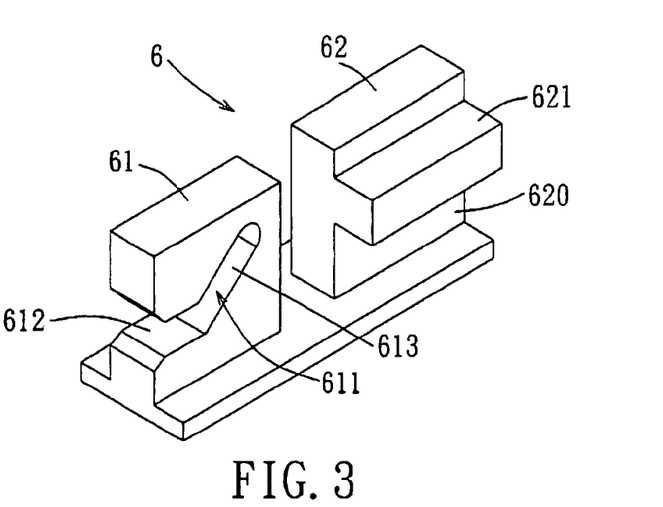
FIG. 3 is a perspective view of a guiding unit of the first preferred embodiment.

Referring to FIGS. 1 to 3, the first preferred embodiment of a slide-type electronic device 1 according to the present invention is exemplified using a notebook computer, but should not be limited thereto in practice. The slide-type electronic device 1 may also be a cell phone, a personal digital assistant, etc.

The slide-type electronic device 1 includes a slide mechanism 2, first and second casings 3, 4 that are coupled to each other through the slide mechanism 2 and that are slidable relative to each other, a connecting member 5, two guiding units 6 provided on the first casing 3, and two pivot units 7 provided on the second casing 4.

In this embodiment, the first casing 3 is a computing device of a notebook computer, and has a top face 301 that is provided with a keyboard unit 31. The top face 301 is provided with a slide groove 32 that is disposed behind the keyboard unit 31 and that extends in a front-to-rear direction such that the connecting member 5 can extend through and slide along the slide groove 32. The two guiding units 6 are disposed respectively on two opposite sides of the top face 301 of the first casing 3.

In this embodiment, each guiding unit 6 includes first and second guide blocks 61, 62 that are spaced apart from each other with one in front of the other. The first guide block 61 has a guide groove 611. The guide groove 611 includes a horizontal guide groove segment 612 that extends horizontally rearward from a front end of the first guide block 61, and an inclined guide groove segment 613 that extends obliquely upward from a rear end of the horizontal guide groove segment 612. Each of the second guide blocks 62 has an inner lateral face 620 facing toward a central portion of the first casing 3 and provided with a guide flange 621.

The second casing 4 includes a frame seat 41 disposed on the first casing 3, and an auxiliary casing 42 received in the frame seat 41. In this embodiment, the auxiliary casing 42 has a top face provided with a display screen 420. The frame seat 41 includes a base plate 411 and a frame portion surrounding the base plate 41. The frame portion has two lateral frame strips 412 on left and right sides of the base plate 411. Each lateral frame strip 412 has an inner side formed with a recess 413 that extends in the front-to-rear direction and that is open at a bottom side of the frame seat 41. The two guiding units 6 on the two sides of the top face 301 of the first casing 3 extend respectively into the recesses 413 in the two lateral frame strips 412 of the frame seat 41. The two pivot units 7 are disposed respectively on two opposite sides of a front edge of the auxiliary casing 42, and extend respectively into the recesses 413 in the two lateral frame strips 412 on the left and right sides of the base plate 411. Each pivot unit 7 includes a first pivot 71 and a second pivot 72 spaced apart from each other with one in front of the other. The positions of the two pivot units 7 correspond to those of the two guide grooves 611 in the two first guide blocks 61.

In this embodiment, left and right lateral edges of the auxiliary casing 42 are respectively formed with slide grooves 414. Each slide groove 414 has a front section located behind a respective one of the pivot units 7, and an open end 415 at a bottom face of the auxiliary casing 42, the function of which will be discussed hereinafter.

Figure 4:
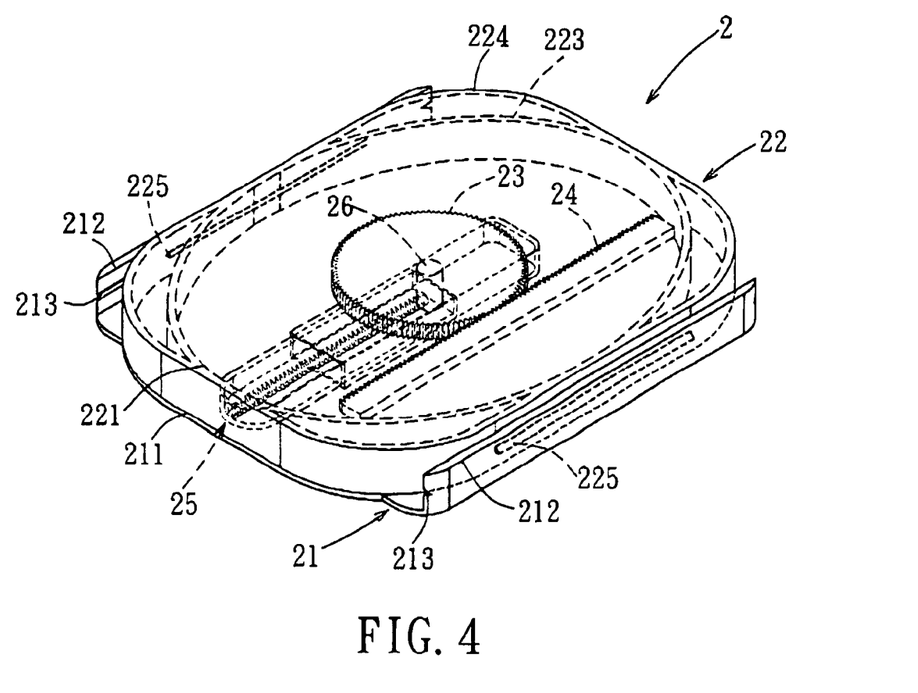
FIG. 4 is a perspective view of a slide mechanism of the first preferred embodiment.
Figure 5:
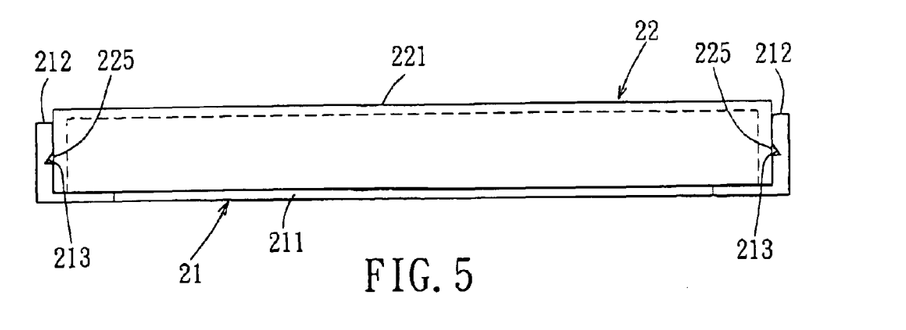
FIG. 5 is a front view of the slide mechanism.
Figure 6:
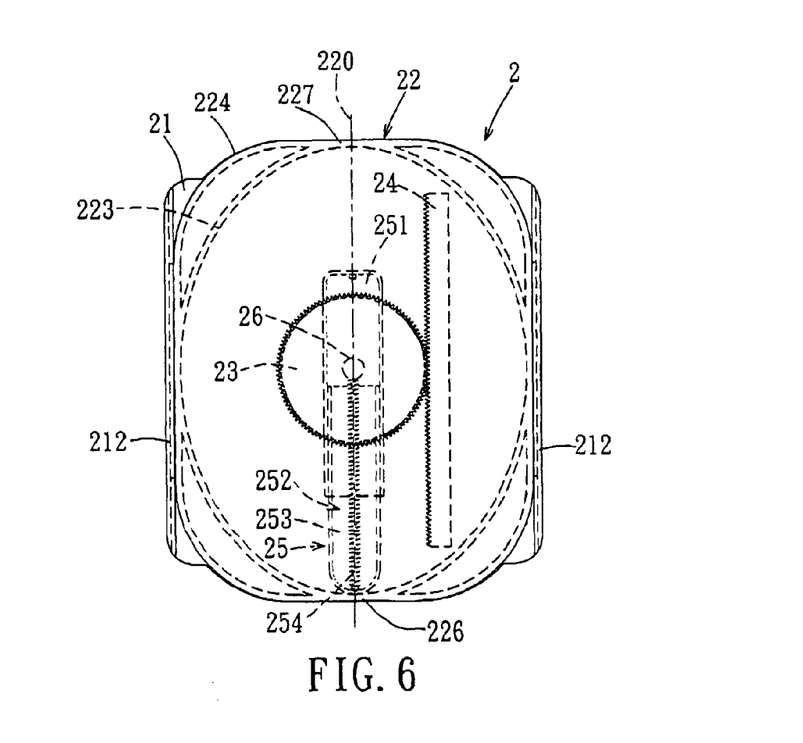
FIG. 6 is a top view to illustrate a shell unit of the slide mechanism, in which an upper shell has yet to be slid rearward relative to a lower shell.

Referring to FIGS. 4, 5 and 6, in this embodiment, the slide mechanism 2 includes a shell unit composed of a lower shell 21 and an upper shell 22 that are coupled slidably to each other, a pinion gear 23 disposed between the lower and upper shells 21, 22, a rack gear 24, a sliding assisting member 25, and a pivot shaft 26.

The lower shell 21 includes a bottom wall 211, and two spaced-apart side walls 22 extending upward from left and right sides of the bottom wall 211. The upper shell 22 includes a top wall 221 spaced apart from the bottom wall 211, and a surrounding wall connected to the top wall 221 and extending downwardly to be interposed between the bottom wall 211 and the top wall 221. The surrounding wall includes an inner surrounding wall portion 223 having a substantially elliptical profile, and an outer surrounding wall portion 224 around the inner surrounding wall portion 223. The outer surrounding wall portion 224 of the upper shell 22 is located between the two side walls 212 of the lower shell 21 for coupling to the lower shell 21. Furthermore, as shown in FIG. 5, inner wall surfaces of the two side walls 212 of the lower shell 21 and an outer wall surface of the outer surrounding wall portion 224 of the upper shell 22 are respectively provided with grooves 213 and ribs 225 that are inter-engageable and that are slidable relative to each other, thereby enabling the lower and upper shells 21, 22 to slidably engage each other and to slide back and forth relative to each other.

The pivot shaft 26 is mounted on a top face of the bottom wall 211 and is disposed between the bottom wall 211 and the top wall 221. It is noted that, in this embodiment, the inner surrounding wall portion 223 of the upper shell 22 has first and second parts 226, 227 that are at two opposite sides of the pivot shaft 26 and that are farthest from the pivot shaft 26. Both the first and second parts 226, 227 lie in a long-axis direction 220 defined by the elliptical profile of the inner surrounding wall portion 223.

The pinion gear 23 is pivoted to the bottom wall 211 by means of the pivot shaft 26 and is interposed between the bottom wall 211 and the top wall 221. The rack gear 24 is provided on the top wall 221, extends in a front-to-rear direction, and meshes with the pinion gear 23. The sliding assisting member 25 includes a fixing portion 251 and a resilient portion 252 that is resiliently stretchable and retractable relative to the fixing portion 251. The fixing portion 251 is in the form of a sleeve, is connected to the pinion gear 23 through the pivot shaft 26, and is interposed between the pinion gear 23 and the bottom wall 211. When the pinion gear 23 rotates, the fixing portion 251, together with the resilient portion 252, will rotate with the pinion gear 23. The resilient portion 252 includes a movable sleeve 253 fitted to the fixing portion 251, and a compression spring 254. The compression spring 254 has one end disposed in the fixing portion 251 (or abutting against the pivot shaft 26), and another end disposed in and abutting against the movable sleeve 253 such that the movable sleeve 253 may resiliently stretch or retract relative to the fixing portion 251. In addition, due to the biasing force of the compression spring 254, a free end of the movable sleeve 253 abuts against the inner wall surface of the inner surrounding wall portion 223 of the upper shell 22.

Figure 7:
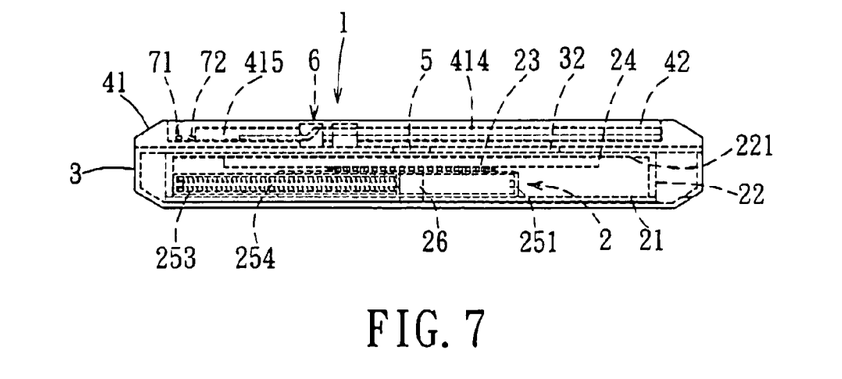
FIG. 7 is a side view showing the shell unit of the slide mechanism in the state of FIG. 6.
Figure 8:
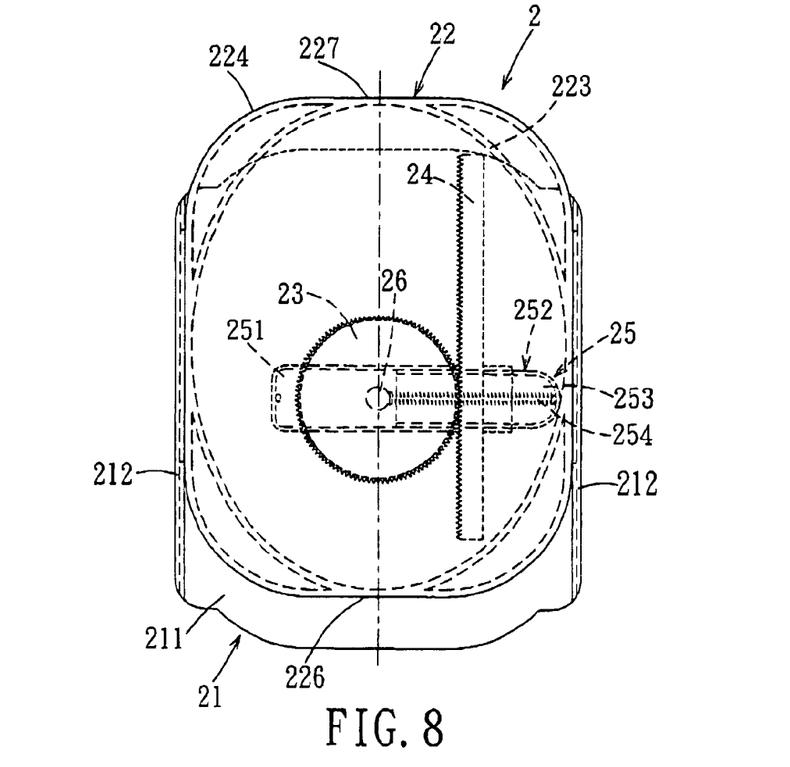
Figure 9:
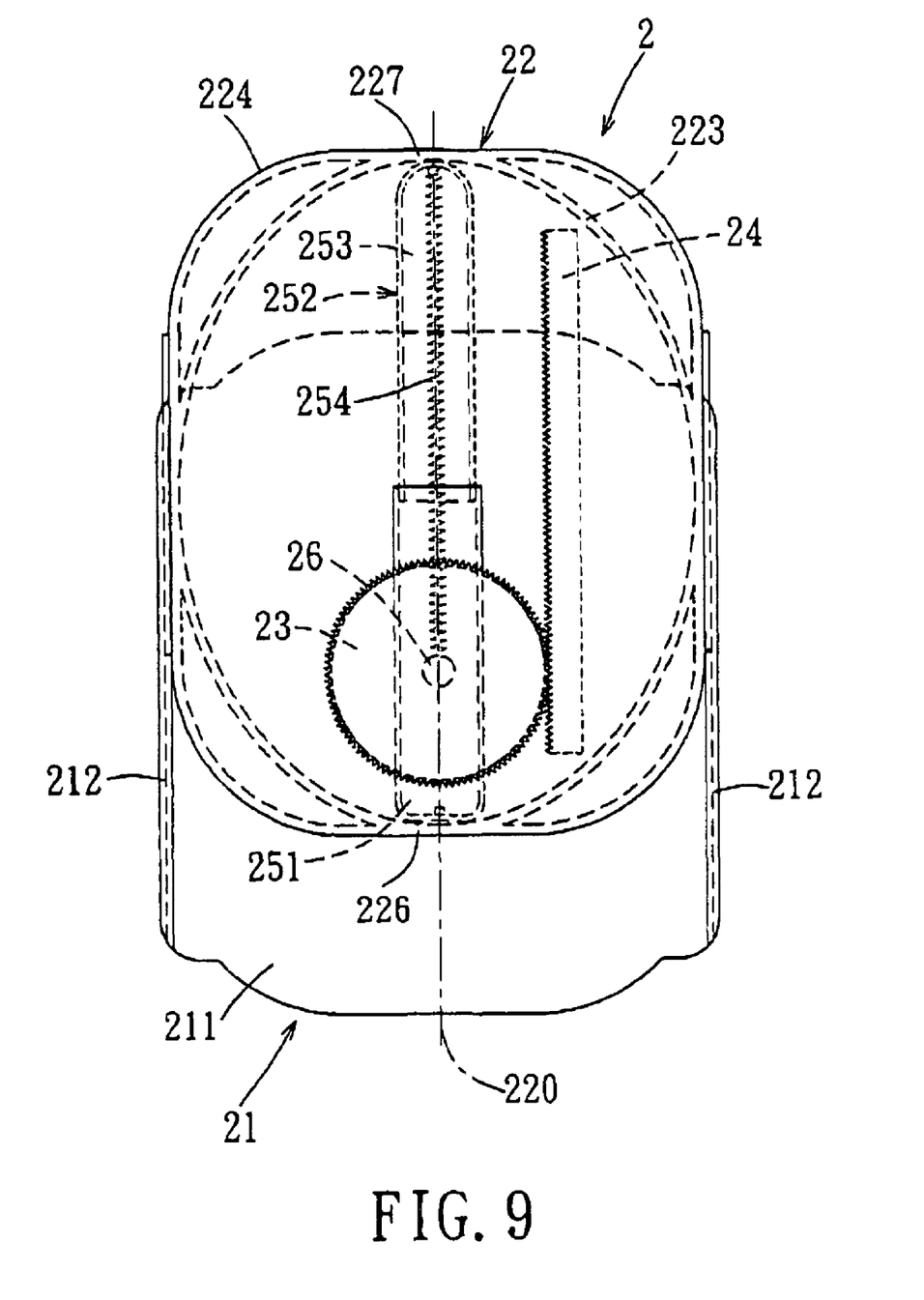
FIG. 9 is a top view to illustrate the shell unit, in which the upper shell is slid rearward relative to the lower shell.

Referring to FIG. 7, in this embodiment, the slide mechanism 2 is accommodated in the first casing 3, and the top wall 221 of the upper shell 22 is connected to the frame seat 41 of the second casing 4 through the connecting member 5 that extends through the slide groove 32 (see FIG. 1) in the first casing 3.

Referring to FIGS. 1, 6 and 7, when the slide-type electronic device 1 is disposed in a closed state, the auxiliary casing 42 lies substantially flat within the frame seat 41, the two pivot units 7 are respectively disposed in front ends of the recesses 413 in the left and right lateral frame strips 412, and the guide flanges 621 of the two second guide blocks 62 extend respectively into the slide grooves 414 in the left and right lateral edges of the auxiliary casing 42.

As for the slide mechanism 2, the upper shell 22 substantially overlaps the lower shell 21, and the pivot shaft 26 is located at a geometric center of the elliptical profile defined by the inner surrounding wall portion 223. The free end of the movable sleeve 253 of the sliding assisting member 25 abuts against the inner surrounding wall portion 223 at the first part 226.

Referring to FIG. 6, and FIGS. 8 to 10, when the second casing 4 is pushed rearward relative to the first casing 3, for the slide mechanism 2, due to the connection through the connecting member 5, the upper shell 22 of the slide mechanism 2 will also slide rearward relative to the lower shell 21, so that the rack gear 24 moves rearward relative to the pinion gear 23 and brings the pinion gear 23 and the sliding assisting member 25 to rotate therewith concurrently, whereas the resilient portion 252 will slide from the first part 226 to the second part 227 along the inner surrounding wall portion 223. Moreover, during the process when the upper shell 22 slides rearward relative to the lower shell 21 to bring the resilient portion 252 to slide along the inner surrounding wall portion 223, the first part 226 of the inner surrounding wall portion 223 gradually approaches the pivot shaft 26 such that the compression spring 254 within the resilient portion 252 is first compressed. When the upper shell 22 has slid rearward relative to the lower shell 21 to a position shown in FIG. 8, the restoration force of the compression spring 254 is gradually released. At this point, due to the restoration force of the compression spring 254, the sliding assisting member 25 will continue to rotate rearward such that the upper shell 22 slides rearward to the position shown in FIG. 9, where the fixing portion 251 abuts against the inner surrounding wall portion 223 at the first part 226, and the resilient portion 252 reaches the second part 227 and is oriented rearward.

In other words, during the process when the second casing 4 is pushed rearward relative to the first casing 3, initially, the second casing 4 is subjected to an external pushing force so that the second casing 4 slides rearwardly, but when the second casing 4 has slid to a certain position (e.g., the position shown in FIG. 8) where the distance between the inner surrounding wall portion 223 and the pivot shaft 26 of the slide mechanism 2 begins to increase gradually, by virtue of the restoration force of the compression spring 254, the second casing 4 continues to slide rearward to the position where the keyboard unit 31 on the top face 301 of the first casing 3 is completely exposed, thereby placing the slide-type electronic device 1 in a fully extended state as shown in FIG. 2. In this state, the keyboard unit 31 is completely exposed for operation.

On the contrary, when it is desired to restore the slide-type electronic device 1 to the closed state, the second casing 4 is pushed forward relative to the first casing 3, and the slide mechanism 2 will operate in a reverse order to permit the second casing 4 to return to the closed state shown in FIG. 1.

Figure 10:
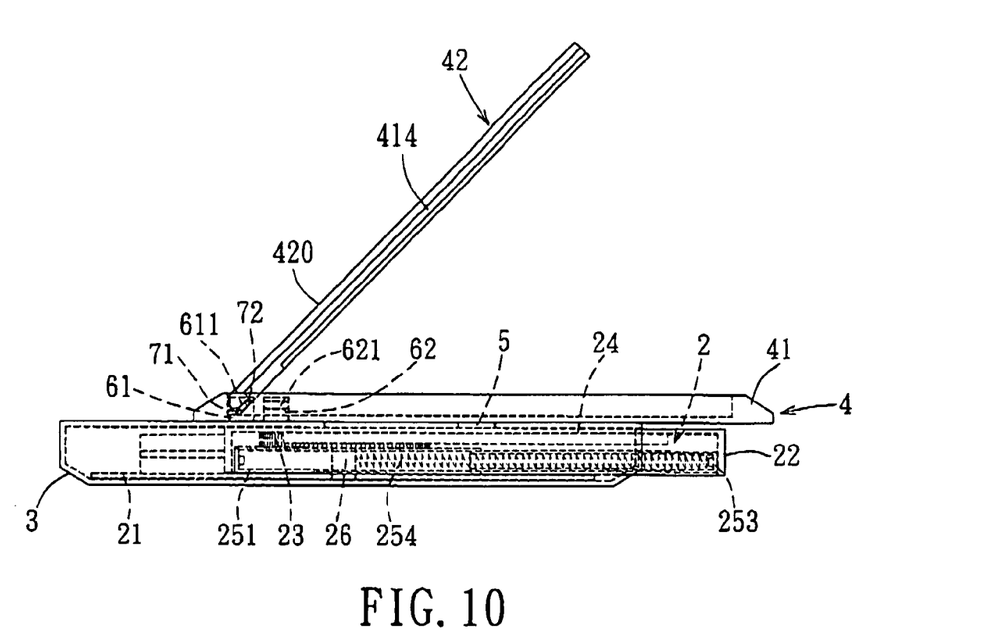
FIG. 10 is a side view of the first preferred embodiment, in which the slide mechanism is in the state of FIG. 9.

It is further noted that, in this embodiment, if the length of the first casing 3 in the front-to-rear direction is shorter than the rearward sliding path of the upper shell 22 relative to the lower shell 21, an opening 302 (see FIG. 1) corresponding to the upper shell 22 of the slide mechanism 2 may be provided in a rear edge of the first casing 3 such that, when the second casing 4 slides rearward relative to the first casing 3 to bring the upper shell 22 to displace rearward, as shown in FIG. 10, a part of the upper shell 22 can extend through the rear edge of the first casing 3.

Figure 11:
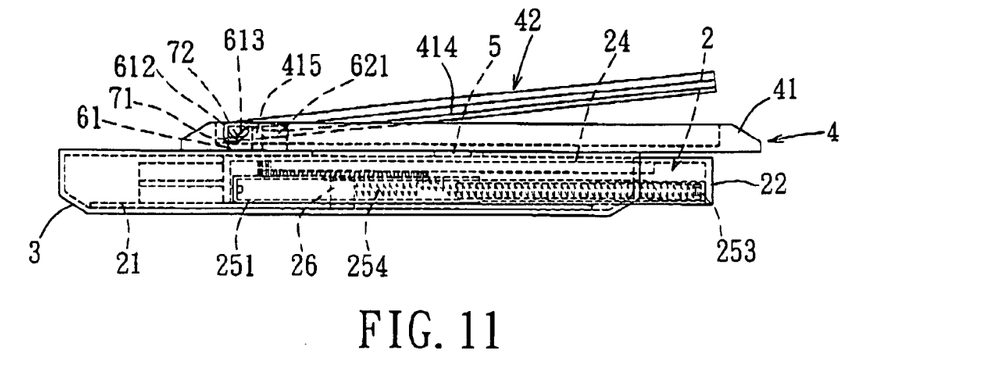
FIG. 11 is a side view to illustrate an auxiliary casing of the first preferred embodiment which starts to flip up.

On the other hand, referring to FIGS. 7, 10, and 11, during the process when the second casing 4 slides rearward relative to the first casing 3, when the auxiliary casing 42, together with the frame seat 41, slides rearward to where the second pivots 72 at both sides of the auxiliary casing 42 enter the horizontal guide groove segments 612 of the two first guide blocks 61, as shown in FIG. 11, the guide flanges 621 of the two second guide blocks 62 concurrently slide into the open ends 415 of the slide grooves 414. Subsequently, when the second casing 4 continues to slide rearward so that the two second pivots 72 continue to be pushed rearward up the respective inclined guide groove segments 613 by the respective horizontal guide groove segments 612, due to the configuration of the inclined guide groove segments 613, the rear edge of the auxiliary casing 42 is pushed upward away from the frame seat 41, so that the entire auxiliary casino 42 begins to turn forward until, as shown in FIG. 10, each first pivot 71 also enters the respective horizontal guide groove segment 612 and reaches a juncture between the horizontal guide groove segment 612 and the inclined guide groove segment 613. At this point, the auxiliary casing 42 is supported in an upright state and forms an angle with the frame seal 41, with the display screen 420 oriented forwardly to facilitate viewing by a user operating the keyboard unit 31 of the first casing 3.

It is noted herein that, with the guide flanges 621 extending into the respective slide grooves 414, the guide flanges 621 and the slide grooves 414 serve to prevent inadvertent outward flipping of the auxiliary casing 42 from the frame seat 41 when the slide-type electronic device 1 is in the closed state shown in FIG. 1, which is inconvenient in terms of carrying. The open ends 415 of the slide grooves 414 permit the guide flanges 621 to disengage smoothly from the slide grooves 414 when the auxiliary casing 42 is to be flipped up so as not to obstruct the flipping of the auxiliary casing 42.

It is further noted that structures, such as bosses 300 shown in FIG. 2, can be provided on the top face 301 of the first casing 3 behind the keyboard unit 31 such that, when the second casing 4 has displaced to the extended state relative to the first casing 3 as shown in FIG. 2, the bosses 300 can stop a front edge of the second casing 4 to prevent possible forward movement of the second casing 4 due to the weight of the auxiliary casing 42.

Figure 12:
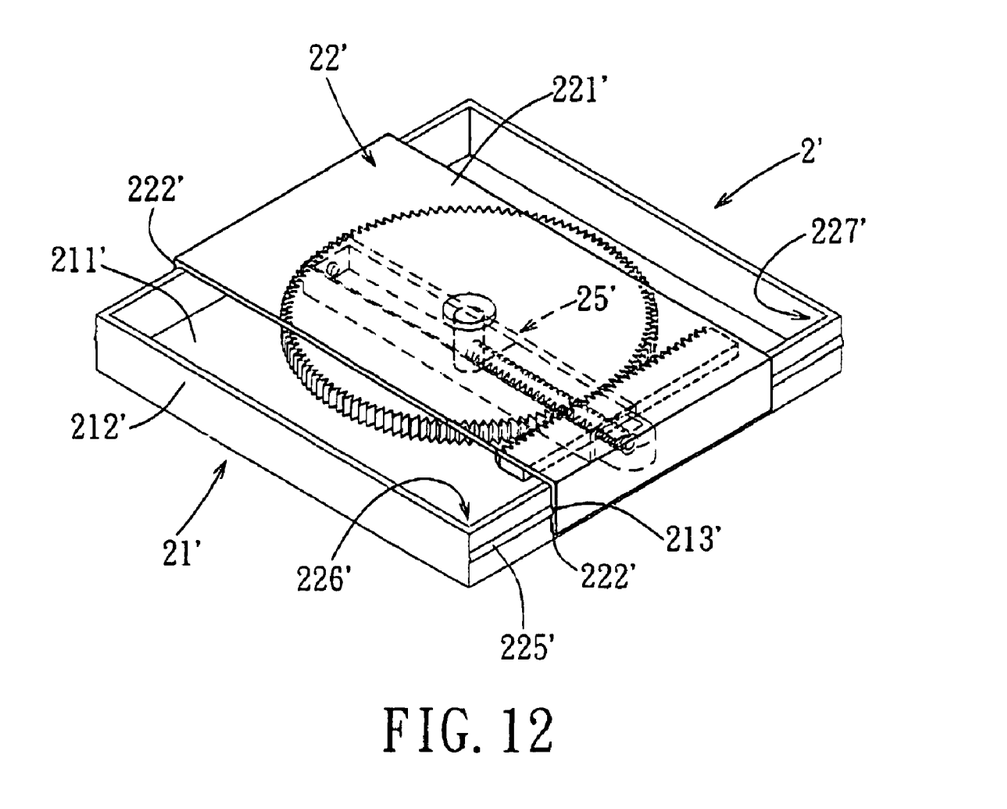
FIG. 12 is a perspective view of a slide mechanism of the second preferred embodiment of a slide type electronic device according to the present invention.
Figure 13:
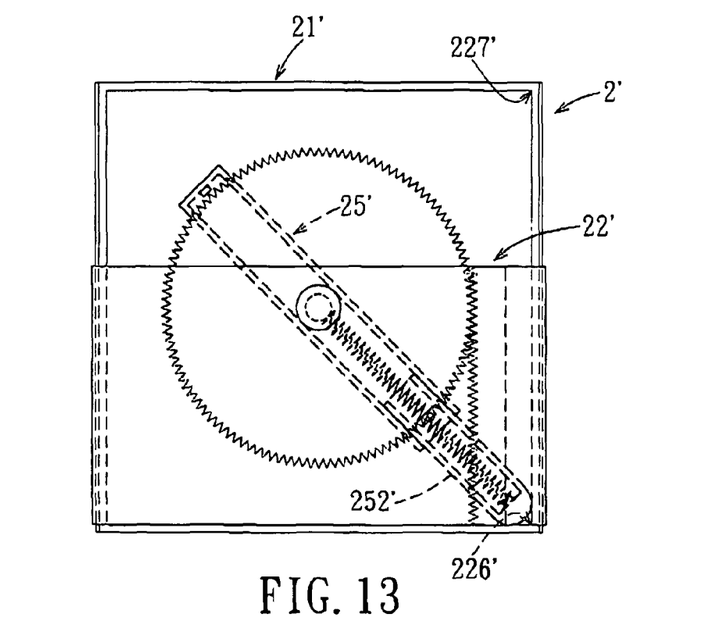
FIG. 13 is a top view of a shell unit of the slide mechanism of FIG. 12, in which an upper shell has yet to be slid rearward relative to a lower shell.
Figure 14:
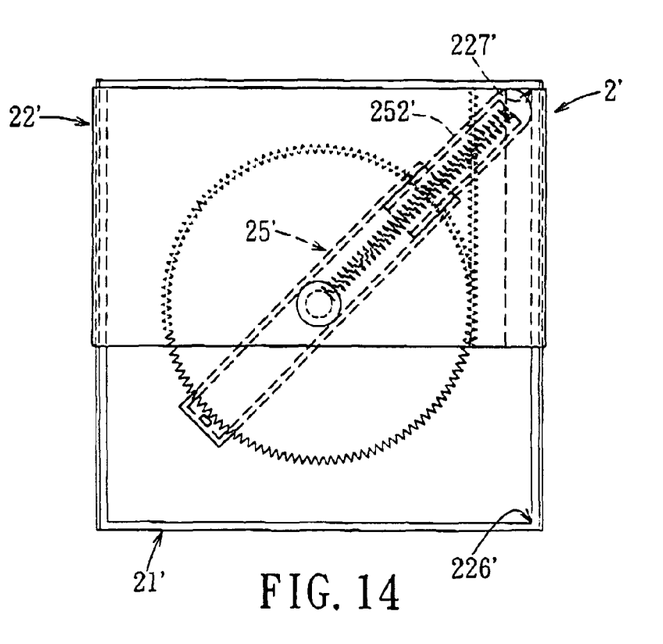
FIG. 14 is a top view to illustrate the shell unit of the slide mechanism of FIG. 12, in which the upper shell is slid rearward relative to the lower shell.

FIGS. 12 to 14 illustrate the second preferred embodiment of this invention, which is substantially similar to the first preferred embodiment, and which differs from the first preferred embodiment mainly in the structures of the lower shell 21' and the upper shell 22' of the shell unit of the slide mechanism 2'. In the second preferred embodiment, the lower shell 21' includes a bottom wall 211' and a surrounding wall 212' connected to a periphery of the bottom wall 211'. The surrounding wall 212' is rectangular in shape, and the first part 226' and the second part 227' are two adjacent corners defined by the rectangular surrounding wall 212' (i.e., the front right corner and the rear right corner of the lower shell 21' shown in FIG. 12). The upper shell 22' includes a top wall 221' spaced apart from the bottom wall 211', and two side walls 222' connected to two opposite sides of the top wall 221'. The two side walls 222' are located on an outer side of the surrounding wall 212' of the lower shell 21', and are connected slidably thereto through engagement between the grooves 213' and the ribs 225'.

As shown in FIG. 13, when the slide-type electronic device 1 is in a closed state shown in FIG. 1, the upper shell 22' substantially overlaps a front half portion of the lower shell 21', and the resilient portion 252' of the sliding assisting member 25' is located at the first part 226' of the surrounding wall 212'. When the second casing 4 (see FIG. 2) is slid rearward relative to the first casing 3 (see FIG. 2), the upper shell 22' is brought to slide rearward relative to the lower shell 21', so that the resilient portion 252' rotates rearward about 90 degrees along the surrounding wall 212' to reach the second part 227', thereby placing the slide-type electronic device 1 in the extended state shown in FIG. 2.

In sum, the present invention utilizes the pinion gear 23 and the rack gear 24 in cooperation with the sliding assisting member 25, 25' and the surrounding wall 223, 212' to achieve the slide mechanism 2, 2' for the slide-type electronic device 1. Furthermore, with the arrangement of the pivot units 7 and the guiding units 6, during the process of rearward sliding of the second casing 4 relative to the first casing 3, the auxiliary casing 42 flips up. Thus, the slide mechanism 2, 2' of the present invention is different from that disclosed in the aforesaid U.S. Patent Application Publication No. 2007/0058328.

In addition, compared with the aforesaid U.S. Pat. No. 1,065, 835, the present invention is more convenient in terms of operation since the auxiliary casing 42 can be simultaneously erected when the second casing 4 is slid rearward relative to the first casing 3.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A slide mechanism comprising:
    a shell unit including a bottom wall, a top wall spaced apart from said bottom wall and slidable back and forth relative to said bottom wall, and a surrounding wall disposed between and connected to one of said bottom wall and said top wall, said surrounding wall having an inner wall surface;
    a pinion gear mounted pivotally to said bottom wall;
    a sliding assisting member including a fixing portion connected to and rotatable with said pinion gear, and a resilient portion resiliently stretchable and retractable relative to said fixing portion and abutting against said inner wall surface of said surrounding wall; and
    a rack gear provided on said top wall and meshing with said pinion gear such that, when said top wall is slid relative to said bottom wall, said rack gear brings said pinion gear and said sliding assisting member to rotate so as to cause said resilient portion to slide along said inner wall surface of said surrounding wall.

2. The slide mechanism according to claim 1, wherein said fixing portion is in a form of a sleeve connected to said pinion gear, said resilient portion including a movable sleeve fitted to said fixing portion, and a compression spring, said compression spring having one end disposed in and abutting against said fixing portion, and another end disposed in and abutting against said movable sleeve.

3. The slide mechanism according to claim 2, wherein said surrounding wall includes an inner surrounding wall portion having a substantially elliptical profile and defining a long-axis direction, said resilient portion abutting against said inner wall surface at said inner surrounding wall portion, said inner surrounding wall portion having first and second parts that lie in the long-axis direction, said compression spring being compressed when said resilient portion slides to a position of said inner surrounding wall portion which is between said first and second parts.

4. The slide mechanism according to claim 2, wherein said surrounding wall is substantially rectangular and defines four corners, said top wall being slidable relative to said bottom wall such that said resilient portion is slidable from one of said corners to another one of said corners, said compression spring being compressed when said resilient portion slides to a position of said surrounding wall between two of said corners.

5. The slide mechanism according to claim 4, wherein said shell unit further includes two side walls connected to two opposite sides of said top wall, said surrounding wall being connected to said bottom wall and being disposed between said side walls, each of said side walls and a corresponding adjacent part of said surrounding wall being respectively formed with a groove and a rib that are inter-engageable and that are slidable relative to each other, such that said surrounding wall is connected slidably between said side walls.

6. The slide mechanism according to claim 1, wherein said shell unit further includes two side walls connected respectively to two opposite sides of said bottom wall, said surrounding wall being connected to said top wall and being disposed between said side walls, each of said side walls and a corresponding adjacent part of said surrounding wall being respectively formed with a groove and a rib that are inter-engageable and that are slidable relative to each other, such that said surrounding wall is connected slidably between said side walls.

7. The slide mechanism according to claim 1, further comprising a pivot shaft connected to said bottom wall and interposed between said top wall and said bottom wall, said pinion gear being mounted pivotally to said bottom wall through said pivot shaft, said sliding assisting member being mounted between said pinion gear and said bottom wall through said pivot shaft.

8. A slide-type electronic device comprising:
    a first casing;
    a second casing disposed on said first casing; and
    a slide mechanism including
        a shell unit including a bottom wall, a top wall spaced apart from said bottom wall and slidable back and forth relative to said bottom wall, and a surrounding wall disposed between and connected to one of said bottom wall and said top wall, said surrounding wall having an inner wall surface, said bottom wall being connected to said first casing, said top wall being connected to said second casing,
    a pinion gear mounted pivotally on said bottom wall,
    a sliding assisting member including a fixing portion connected to and rotatable with said pinion gear, and a resilient portion resiliently stretchable and retractable relative to said fixing portion and abutting against said inner wall surface of said surrounding wall, and
    a rack gear provided on said top wall and meshing with said pinion gear such that, when said second casing is slid relative to said first casing to result in sliding movement of said top wall relative to said bottom wall, said rack gear brings said pinion gear and said sliding assisting member to rotate so as to cause said resilient portion to slide along said inner wall surface of said surrounding wall.

9. The slide-type electronic device according to claim 8, wherein said second casing includes a frame seat, and an auxiliary casing received in said frame seat and having a front edge, said slide-type electronic device further comprising two pivot units, said pivot units being provided respectively on two opposite sides of said front edge of said auxiliary casing, said auxiliary casing being mounted pivotally on two opposite sides of said frame seat through said pivot units so as to be able to flip up relative to said frame seat.

10. The slide-type electronic device according to claim 9, wherein said frame seat has two lateral frame strips corresponding to said two opposite sides of said auxiliary casing, said first casing being provided with a pair of guiding units, each of which is adjacent to a corresponding one of said lateral frame strips and is formed with a guide groove that corresponds to one of said pivot units, said guide groove of each of said guiding units having an inclined guide groove segment that increases in height from front to rear such that, when said second casing is slid rearward relative to said first casing, said pivot units on said two opposite sides of said auxiliary casing climb up along said inclined guide groove segments of said guide grooves of said guiding units, respectively, such that said auxiliary casing flips up with a rear edge thereof moving upward away from said frame seat.

11. The slide-type electronic device according to claim 10, wherein each of said lateral frame strips is formed with a recess that extends in a front-to-rear direction, each of said guiding units extending into said recess in the corresponding one of said lateral frame strips and including a first guide block formed with said slice groove.

12. The slide-type electronic device according to claim 11, wherein said auxiliary casing has a bottom face, said two opposite sides of said auxiliary casing being respectively provided with slide grooves that extend in the front-to-rear direction, each of said slide grooves having a front section with an open end at said bottom face of said auxiliary casing, each of said guiding units further including a second guide block disposed behind said first guide block, and having an inner side formed with a guide flange that extends into a respective one of said slide grooves in said two opposite sides of said auxiliary casing when said auxiliary casing is received in said frame seat, and wherein, when said pivot units on said two opposite sides of said auxiliary casing climb up along said inclined guide groove segments to enable said auxiliary casing to flip up relative to said frame seat, said guide flanges slide respectively into said open ends of said slide grooves.

13. The slide-type electronic device according to claim 11, wherein said first guide block has a front end, said guide groove in said first guide block of each of said guiding units further having a horizontal guide groove segment, said horizontal guide groove segment extending rearward from said front end of said first guide block and having a rear end, said inclined guide groove segment being connected to said rear end of said horizontal guide groove segment, each of said pivot units including first and second pivots that are spaced apart from each other with one in front of the other.

14. The slide-type electronic device according to claim 8, wherein said fixing portion is in a form of a sleeve connected to said pinion gear, said resilient portion including a movable sleeve fitted to said fixing portion, and a compression spring, said compression spring having one end disposed in and abutting against said fixing portion and another end disposed in and abutting against said movable sleeve.

15. The slide-type electronic device according to claim 14, wherein said surrounding wall includes an inner surrounding wall portion having a substantially elliptical profile and defining a long-axis direction, said resilient portion abutting against said inner wall surface at said inner surrounding wall portion, said inner surrounding wall portion having first and second parts that lie in the long-axis direction, said compression spring being compressed when said resilient portion slides to a position of said inner surrounding wall portion which is between said first and second parts.

16. The slide-type electronic device according to claim 14, wherein said surrounding wall is substantially rectangular and defines four corners, said top wall being slidable relative to said bottom wall such that said resilient portion is slidable from one of said corners to another one of said corners, said compression spring being compressed when said resilient portion slides to a position of said surrounding wall between two of said corners.

17. The slide-type electronic device according to claim 16, wherein said shell unit further includes two side walls connected to two opposite sides of said top wall, said surrounding wall being connected to said bottom wall and being disposed between said side walls, each of said side walls and a corresponding adjacent part of said surrounding wall being respectively formed with a groove and a rib that are inter-engageable and that are slidable relative to each other, such that said surrounding wall is connected slidably between said side walls.

18. The slide-type electronic device according to claim 8, wherein said shell unit further includes two side walls connected respectively to two opposite sides of said bottom wall, said surrounding wall being connected to said top wall and being disposed between said side walls, each of said side walls and a corresponding adjacent part of said surrounding wall being respectively formed with a groove and a rib that are inter-engageable and that are slidable relative to each other, such that said surrounding wall is connected slidably between said side walls.

19. The slide-type electronic device according to claim 8, wherein said slide mechanism further includes a pivot shaft connected to said bottom wall and disposed between said top and bottom walls, said pinion gear being mounted pivotally to said bottom wall through said pivot shaft, said sliding assisting member being mounted between said pinion gear and said bottom wall through said pivot shaft.

20. The slide-type electronic device according to claim 8, further comprising a connecting member, said first casing having a top face provided with a slide groove extending in a front-to-rear direction, said connecting member extending through said slide groove, and having one end connected to said top wall of said shell unit and another end connected to said second casing.

* * * * *